(12) United States Patent
Wang et al.

(10) Patent No.: US 10,623,158 B2
(45) Date of Patent: *Apr. 14, 2020

(54) CHANNEL STATE INFORMATION FRAMEWORK DESIGN FOR 5G MULTIPLE INPUT MULTIPLE OUTPUT TRANSMISSIONS

(71) Applicant: AT&T Intellectual Property I, L.P., Atlanta, GA (US)

(72) Inventors: Xiaoyi Wang, Austin, TX (US); Arunabha Ghosh, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/186,766

(22) Filed: Nov. 12, 2018

(65) Prior Publication Data

US 2019/0081755 A1   Mar. 14, 2019

Related U.S. Application Data

(63) Continuation of application No. 15/376,377, filed on Dec. 12, 2016, now Pat. No. 10,171,214.

(Continued)

(51) Int. Cl.
*H04L 5/00* (2006.01)
*H04W 72/04* (2009.01)
(Continued)

(52) U.S. Cl.
CPC ......... *H04L 5/0048* (2013.01); *H04B 7/0417* (2013.01); *H04B 7/0626* (2013.01); *H04B 7/0645* (2013.01)

(58) Field of Classification Search
CPC ... H04L 5/0048; H04B 7/0626; H04B 7/0417; H04B 7/0645
See application file for complete search history.

(56) References Cited

U.S. PATENT DOCUMENTS 7,002,949 B2   2/2006   Garcia-luna-aceves et al.
7,020,110 B2   3/2006   Walton et al.
(Continued)

FOREIGN PATENT DOCUMENTS

CN   1627849   6/2005
CN   101631355 A   1/2010
(Continued)

OTHER PUBLICATIONS

Notice of Allowance received for U.S. Appl. No. 15/432,515 dated Feb. 25, 2019, 27 pages.
(Continued)

*Primary Examiner* — Kiet Tang
(74) *Attorney, Agent, or Firm* — Amin, Turocy & Watson, LLP

(57) ABSTRACT

A user equipment can be configured to decompose a multiple input multiple output (MIMO) channel into multiple domains, measure the channel state information reference signal (CSI-RS) for each domain, and select a feedback format for transmission to network node based on the measurements. The network node can use the feedback to determine transmission parameters to be transmitted to the user equipment.

20 Claims, 10 Drawing Sheets

Related U.S. Application Data

(60) Provisional application No. 62/401,858, filed on Sep. 29, 2016.

(51) Int. Cl.
  *H04L 1/00* (2006.01)
  *H04B 7/06* (2006.01)
  *H04B 7/0417* (2017.01)

(56) References Cited

U.S. PATENT DOCUMENTS

| | | | |
|---|---|---|---|
| 7,209,443 B2 | 4/2007 | Mukai et al. | |
| 7,260,366 B2 | 8/2007 | Lee et al. | |
| 7,551,546 B2 | 6/2009 | Ma et al. | |
| 7,636,573 B2 | 12/2009 | Walton et al. | |
| 7,698,463 B2 | 4/2010 | Ogier et al. | |
| 7,877,067 B2 | 1/2011 | Hwang et al. | |
| 7,907,512 B1 | 3/2011 | Von der Embse | |
| 8,018,889 B2 | 9/2011 | Lim et al. | |
| 8,040,844 B2 | 10/2011 | Olexa et al. | |
| 8,055,269 B2 | 11/2011 | Feher | |
| 8,102,794 B2 | 1/2012 | Shin et al. | |
| 8,159,399 B2 | 4/2012 | Dorsey et al. | |
| 8,165,536 B2 | 4/2012 | Sekiya et al. | |
| 8,189,577 B2 | 5/2012 | Vaswani et al. | |
| 8,218,550 B2 | 7/2012 | Axelsson et al. | |
| 8,271,043 B2 | 9/2012 | Kim et al. | |
| 8,300,555 B2 | 10/2012 | Horn et al. | |
| 8,306,525 B2 | 11/2012 | Feher | |
| 8,423,068 B2 | 4/2013 | Tiwari et al. | |
| 8,509,060 B1 | 8/2013 | Dong et al. | |
| 8,537,658 B2 | 9/2013 | Sayana et al. | |
| 8,537,714 B2 | 9/2013 | Liu | |
| 8,553,560 B2 | 10/2013 | Axelsson et al. | |
| 8,578,054 B2 | 11/2013 | Thubert et al. | |
| 8,665,797 B2 | 3/2014 | Ding et al. | |
| 8,681,747 B2 | 3/2014 | Dateki et al. | |
| 8,711,716 B2 | 4/2014 | Chen et al. | |
| 8,761,834 B2 | 6/2014 | Luz et al. | |
| 8,774,154 B2 | 7/2014 | Bui | |
| 8,787,257 B2 | 7/2014 | Fujita | |
| 8,798,011 B2 | 8/2014 | Prasad et al. | |
| 8,854,997 B2 | 10/2014 | Clow et al. | |
| 8,873,496 B2 | 10/2014 | Moulsley et al. | |
| 8,929,196 B2 | 1/2015 | Novak et al. | |
| 8,948,046 B2 | 2/2015 | Kang et al. | |
| 9,007,992 B2 | 4/2015 | Charbit et al. | |
| 9,013,974 B2 | 4/2015 | Walton et al. | |
| 9,019,068 B2 | 4/2015 | Varoglu | |
| 9,037,076 B2 | 5/2015 | Nagata et al. | |
| 9,059,753 B2 | 6/2015 | Yang et al. | |
| 9,078,187 B2 | 7/2015 | Huh | |
| 9,084,261 B2 | 7/2015 | Gholmieh et al. | |
| 9,094,145 B2 | 7/2015 | Yue et al. | |
| 9,154,198 B2 | 10/2015 | El-najjar et al. | |
| 9,154,210 B2 | 10/2015 | Li et al. | |
| 9,155,098 B2 | 10/2015 | Geirhofer et al. | |
| 9,161,381 B2 | 10/2015 | Lee et al. | |
| 9,184,870 B2 | 11/2015 | Sampath et al. | |
| 9,191,098 B2 | 11/2015 | Kazmi et al. | |
| 9,215,322 B1 | 12/2015 | Wu et al. | |
| 9,240,871 B2 | 1/2016 | Walton et al. | |
| 9,241,311 B2 | 1/2016 | Sebeni et al. | |
| 9,246,651 B2 | 1/2016 | Guo et al. | |
| 9,265,053 B2 | 2/2016 | Blankenship et al. | |
| 9,288,719 B2 | 3/2016 | Hui et al. | |
| 9,306,725 B2 | 4/2016 | Papasakellariou et al. | |
| 9,307,489 B2 | 4/2016 | Yerrabommanahalli et al. | |
| 9,313,747 B2 | 4/2016 | Zhu et al. | |
| 9,337,970 B2 | 5/2016 | Hammarwall et al. | |
| 9,338,769 B1 | 5/2016 | Naim et al. | |
| 9,345,037 B2 | 5/2016 | Ode | |
| 9,357,472 B2 | 5/2016 | Mukherjee | |
| 9,401,750 B2 | 7/2016 | Sayana et al. | |
| 9,408,220 B2 | 8/2016 | Gore et al. | |
| 9,413,509 B2 | 8/2016 | Chen et al. | |
| 9,414,427 B2 | 8/2016 | Yang et al. | |
| 9,420,577 B2 | 8/2016 | Kim et al. | |
| 9,432,876 B2 | 8/2016 | Ji et al. | |
| 9,451,476 B2 | 9/2016 | Shoshan et al. | |
| 9,467,909 B2 | 10/2016 | Faerber et al. | |
| 9,510,340 B2 | 11/2016 | Kim et al. | |
| 9,602,183 B2 | 3/2017 | Kim et al. | |
| 9,742,480 B1 | 8/2017 | Nammi et al. | |
| 10,027,401 B2 | 7/2018 | Speight et al. | |
| 2003/0039217 A1 | 2/2003 | Seo et al. | |
| 2003/0043756 A1 | 3/2003 | Reynders et al. | |
| 2004/0162048 A1 | 8/2004 | Milbar et al. | |
| 2004/0218604 A1 | 11/2004 | Porter | |
| 2004/0253955 A1 | 12/2004 | Love | |
| 2004/0255040 A1* | 12/2004 | Lopes | H04L 1/0003 709/230 |
| 2005/0036487 A1 | 2/2005 | Srikrishna | |
| 2005/0250506 A1 | 11/2005 | Beale et al. | |
| 2006/0240777 A1 | 10/2006 | Ruuska | |
| 2007/0110198 A1 | 5/2007 | Skarby et al. | |
| 2007/0160156 A1 | 7/2007 | Melzer et al. | |
| 2007/0253496 A1 | 11/2007 | Giannakis et al. | |
| 2007/0288618 A1 | 12/2007 | Yeo et al. | |
| 2008/0002723 A1 | 1/2008 | Pusateri | |
| 2008/0095223 A1 | 4/2008 | Tong et al. | |
| 2009/0029645 A1 | 1/2009 | Leroudier | |
| 2009/0052448 A1 | 2/2009 | Ramakrishnan et al. | |
| 2009/0073922 A1 | 3/2009 | Malladi et al. | |
| 2009/0168915 A1 | 7/2009 | Aoki et al. | |
| 2009/0262673 A1 | 10/2009 | Hermersdorf | |
| 2010/0002675 A1 | 1/2010 | Fu et al. | |
| 2010/0067591 A1 | 3/2010 | Luo et al. | |
| 2010/0178057 A1 | 7/2010 | Shieh | |
| 2010/0202322 A1 | 8/2010 | Cai | |
| 2011/0039495 A1 | 2/2011 | Sawai et al. | |
| 2011/0044262 A1 | 2/2011 | Satapathy et al. | |
| 2011/0085513 A1 | 4/2011 | Chen et al. | |
| 2011/0096727 A1 | 4/2011 | Bergman et al. | |
| 2011/0176445 A1 | 7/2011 | Chen | |
| 2011/0281579 A1 | 11/2011 | Kummetz | |
| 2011/0305161 A1 | 12/2011 | Ekpenyong et al. | |
| 2012/0002598 A1 | 1/2012 | Seo et al. | |
| 2012/0013564 A1 | 1/2012 | Westhues et al. | |
| 2012/0087276 A1 | 4/2012 | Huang et al. | |
| 2012/0093109 A1 | 4/2012 | Dong et al. | |
| 2012/0147810 A1 | 6/2012 | Wang et al. | |
| 2012/0327757 A1 | 12/2012 | Wang et al. | |
| 2012/0327794 A1 | 12/2012 | Han et al. | |
| 2013/0003604 A1 | 1/2013 | Blankenship et al. | |
| 2013/0028241 A1 | 1/2013 | Wang et al. | |
| 2013/0044673 A1 | 2/2013 | Bi et al. | |
| 2013/0095748 A1 | 4/2013 | Hu et al. | |
| 2013/0301628 A1 | 5/2013 | Dacosta et al. | |
| 2013/0155831 A1 | 6/2013 | Kim et al. | |
| 2013/0215844 A1 | 8/2013 | Seol et al. | |
| 2013/0235808 A1 | 9/2013 | Earnshaw et al. | |
| 2013/0242902 A1 | 9/2013 | Liu et al. | |
| 2013/0258973 A1 | 10/2013 | Khoshnevis et al. | |
| 2013/0336199 A1 | 12/2013 | Schwartz et al. | |
| 2013/0337795 A1 | 12/2013 | Falconetti et al. | |
| 2014/0010126 A1 | 1/2014 | Sayana et al. | |
| 2014/0016534 A1 | 1/2014 | Kim et al. | |
| 2014/0044061 A1* | 2/2014 | Yue | H04W 72/042 370/329 |
| 2014/0064160 A1 | 3/2014 | Verger et al. | |
| 2014/0073339 A1 | 3/2014 | Yang | |
| 2014/0086063 A1 | 3/2014 | Wu | |
| 2014/0146754 A1 | 5/2014 | Bayesteh et al. | |
| 2014/0189155 A1 | 7/2014 | Morris | |
| 2014/0269552 A1 | 9/2014 | Saito | |
| 2014/0281670 A1 | 9/2014 | Vasseur et al. | |
| 2015/0031284 A1 | 1/2015 | Pitakdumrongkija et al. | |
| 2015/0071242 A1 | 3/2015 | Vilaipornsawai et al. | |
| 2015/0092695 A1 | 4/2015 | Zhao et al. | |
| 2015/0139208 A1 | 5/2015 | Chan et al. | |
| 2015/0146655 A1 | 5/2015 | Hui et al. | |
| 2015/0155993 A1 | 6/2015 | Berggren et al. | |
| 2015/0181534 A1 | 6/2015 | Andersson et al. | |

(56) References Cited

U.S. PATENT DOCUMENTS

| | | |
|---|---|---|
| 2015/0188650 A1 | 7/2015 | Au et al. |
| 2015/0215085 A1 | 7/2015 | Xu et al. |
| 2015/0245272 A1 | 8/2015 | Lindoff et al. |
| 2015/0249998 A1 | 9/2015 | Long et al. |
| 2015/0282150 A1 | 10/2015 | Nigam et al. |
| 2015/0326422 A1 | 11/2015 | Sagong et al. |
| 2015/0333878 A1 | 11/2015 | Yu et al. |
| 2015/0334643 A1 | 11/2015 | Maaref et al. |
| 2015/0341093 A1 | 11/2015 | Ji et al. |
| 2015/0341100 A1 | 11/2015 | Kwak et al. |
| 2015/0351098 A1 | 12/2015 | Schellmann et al. |
| 2015/0382275 A1 | 12/2015 | Pragada et al. |
| 2016/0006487 A1 | 1/2016 | Ding et al. |
| 2016/0014626 A1 | 1/2016 | Yi et al. |
| 2016/0014762 A1 | 1/2016 | Ji et al. |
| 2016/0028520 A1 | 1/2016 | Nogami et al. |
| 2016/0029359 A1 | 1/2016 | Agiwal |
| 2016/0050039 A1 | 2/2016 | Ma et al. |
| 2016/0080187 A1 | 3/2016 | Yun et al. |
| 2016/0080961 A1 | 3/2016 | Kim et al. |
| 2016/0080963 A1 | 3/2016 | Marinier et al. |
| 2016/0087694 A1 | 3/2016 | Vilaipornsawai et al. |
| 2016/0088521 A1 | 3/2016 | Ho et al. |
| 2016/0119097 A1* | 4/2016 | Nam .............. H04L 5/0023 370/329 |
| 2016/0119931 A1 | 4/2016 | Soriaga et al. |
| 2016/0128028 A1 | 5/2016 | Mallik et al. |
| 2016/0128034 A1 | 5/2016 | Choi et al. |
| 2016/0128072 A1 | 5/2016 | Rajagopal et al. |
| 2016/0142117 A1 | 5/2016 | Rahman et al. |
| 2016/0142292 A1 | 5/2016 | Au et al. |
| 2016/0149686 A1 | 5/2016 | Tsai |
| 2016/0154756 A1 | 6/2016 | Dodson et al. |
| 2016/0183242 A1 | 6/2016 | Cordeiro et al. |
| 2016/0191216 A1 | 6/2016 | Ma et al. |
| 2016/0211999 A1 | 7/2016 | Wild et al. |
| 2016/0233938 A1 | 8/2016 | Mondal et al. |
| 2016/0254889 A1 | 9/2016 | Shattil |
| 2016/0255667 A1 | 9/2016 | Schwartz |
| 2016/0262118 A1 | 9/2016 | Kim et al. |
| 2016/0269135 A1 | 9/2016 | Jiang et al. |
| 2016/0269212 A1 | 9/2016 | Vilaipornsawai et al. |
| 2016/0285611 A1 | 9/2016 | Fischer et al. |
| 2016/0294521 A1 | 10/2016 | Au et al. |
| 2016/0301505 A1 | 10/2016 | Furuskog et al. |
| 2016/0352543 A1 | 12/2016 | Hu et al. |
| 2016/0352551 A1 | 12/2016 | Zhang et al. |
| 2016/0353374 A1 | 12/2016 | Höglund et al. |
| 2016/0353420 A1 | 12/2016 | You et al. |
| 2016/0353453 A1 | 12/2016 | Au et al. |
| 2016/0353475 A1 | 12/2016 | Au et al. |
| 2017/0019847 A1 | 1/2017 | Han et al. |
| 2017/0078054 A1 | 3/2017 | Hadani et al. |
| 2017/0078826 A1 | 3/2017 | Cui et al. |
| 2017/0118054 A1 | 4/2017 | Ma et al. |
| 2017/0126299 A1 | 5/2017 | Wei et al. |
| 2017/0126458 A1 | 5/2017 | Shattil |
| 2017/0134205 A1 | 5/2017 | Kim et al. |
| 2017/0163456 A1 | 6/2017 | Chen |
| 2017/0223700 A1 | 8/2017 | Thubert et al. |
| 2017/0237537 A1 | 8/2017 | Nogami et al. |
| 2017/0257238 A1 | 9/2017 | Qian et al. |
| 2017/0257860 A1 | 9/2017 | Nam et al. |
| 2017/0265769 A1 | 9/2017 | Fang |
| 2017/0272210 A1 | 9/2017 | Zhang |
| 2017/0288928 A1 | 10/2017 | Xu et al. |
| 2017/0311188 A1 | 10/2017 | Sun et al. |
| 2017/0325246 A1 | 11/2017 | Agarwal et al. |
| 2017/0331577 A1 | 11/2017 | Parkvall et al. |
| 2017/0367046 A1 | 12/2017 | Papasakellariou |
| 2017/0374558 A1 | 12/2017 | Zhao et al. |
| 2018/0007696 A1 | 1/2018 | Hasarchi et al. |
| 2018/0014320 A1 | 1/2018 | Xu et al. |
| 2018/0035423 A1 | 2/2018 | Wang et al. |
| 2018/0035459 A1 | 2/2018 | Islam et al. |
| 2018/0049233 A1 | 2/2018 | Luo et al. |
| 2018/0049236 A1 | 2/2018 | Sun et al. |
| 2018/0062823 A1 | 3/2018 | Hasegawa |
| 2018/0063818 A1 | 3/2018 | Chen et al. |
| 2018/0092095 A1 | 3/2018 | Zeng et al. |
| 2018/0097598 A1 | 4/2018 | Ang et al. |
| 2018/0167933 A1 | 6/2018 | Yin et al. |
| 2018/0176059 A1 | 6/2018 | Medles et al. |
| 2018/0184410 A1 | 6/2018 | Wilson et al. |
| 2018/0219606 A1 | 8/2018 | Ng et al. |
| 2018/0220400 A1 | 8/2018 | Nogami et al. |
| 2018/0227156 A1 | 8/2018 | Papasakellariou |

FOREIGN PATENT DOCUMENTS

| | | |
|---|---|---|
| CN | 102647386 A | 8/2012 |
| CN | 103391573 A | 11/2013 |
| CN | 104010343 A | 8/2014 |
| CN | 104168620 A | 11/2014 |
| CN | 104486042 A | 4/2015 |
| EP | 0 720 316 A1 | 7/1996 |
| EP | 1 998 586 A1 | 12/2008 |
| EP | 2 400 674 A2 | 12/2011 |
| EP | 2 858 408 A1 | 4/2015 |
| EP | 3 065 448 A1 | 9/2016 |
| EP | 3 160 051 A1 | 4/2017 |
| JP | 2011-205679 A | 10/2011 |
| JP | 5373076 B2 | 12/2013 |
| WO | 2005/064872 A1 | 7/2005 |
| WO | 2008/011717 A1 | 1/2008 |
| WO | 2013/081628 A1 | 6/2013 |
| WO | 2013/107053 A1 | 7/2013 |
| WO | 2013/136777 A1 | 9/2013 |
| WO | 2015/095844 A1 | 6/2015 |
| WO | 2015/108460 A1 | 7/2015 |
| WO | 2015/122665 A1 | 8/2015 |
| WO | 2015/140601 A1 | 9/2015 |
| WO | 2015/186974 A1 | 12/2015 |
| WO | 2016/023207 A1 | 2/2016 |
| WO | 2016/026507 A1 | 2/2016 |
| WO | 2016/030300 A1 | 3/2016 |
| WO | 2016/065068 A3 | 4/2016 |
| WO | 2016/068628 A1 | 5/2016 |
| WO | 2016/086971 A1 | 6/2016 |
| WO | 2016/105120 A1 | 6/2016 |
| WO | 2016/128728 A2 | 8/2016 |
| WO | 2016/170389 A1 | 10/2016 |

OTHER PUBLICATIONS

Non-Final Office Action received for U.S. Appl. No. 15/376,209 dated May 2, 2019, 40 pages.

Final Office Action received for U.S. Appl. No. 15/340,744 dated Nov. 28, 2018, 38 pages.

Final Office Action received for U.S. Appl. No. 15/432,515 dated Oct. 29, 2018, 43 pages.

Final Office Action received for U.S. Appl. No. 15/376,209 dated Dec. 10, 2018, 37 pages.

Mogensen et al., "5G small cell optimized radio design." IEEE. 2013. http://vbn.aau.dk/files/195969578/Globecom_5G_2013_v16emb.pdf.

Peng et al., "System architecture and key technologies for 5G heterogeneous cloud radio access networks." IEEE network 29.2 (2015): 614. http://arxiv.org/pdf/1412.6677.

Mogensen et al., "Centimeterwave concept for 5G ultradense small cells." 2014 IEEE 79th Vehicular Technology Conference (VTC Spring). IEEE 2014. http://vbn.aau.dk/ws/files/203990574/MWC2020_v5.pdf.

Li et al., "Energyoptimal scheduling with dynamic channel acquisition in wireless downlinks:" IEEE Transactions on Mobile Computing 9.4 (2010): 527539. http://wwwbcf.usc.edu/~mjneely/pdf_papers/lineelycdc07.pdf.

Huynh et al., "Joint Downlink and Uplink Interference Management for Device to Device Communication Underlaying Cellular Networks." Year: 2016 vol. 4 pp. 4420 4430 DOI:10.1109/ACCESS.

(56) References Cited

OTHER PUBLICATIONS 2016.2603149 IEEE Journals & Magazines. http://ieeexplore.ieee.org/iel7/6287639/7419931/07552542.pdf.

Jungnickel et al., "The role of small cells coordinated multipoint and massive MIMO in 5G." IEEE Communications Magazine 52.5 (2014): 44-51. http://nashville.dyndns.org:823/YourFreeLibrary/_Ite/Small%20Cells/smallCells1.pdf.

Namet al., "Advanced interference management for 5G cellular networks." IEEE Communications Magazine 52.5 (2014): 52-60. https://www.researchgate.net/profile/Dongwoon_Bai/publication/262416968_Advanced_Interference_Management_for_5G_Cellular_Networks2/links/5515c7890cf217d80a3594b5.pdf.

Guvensen et al., "A Generalized Framework on Beamformer Design and CSI Acquisition for Single-Carrier Massive MIMO Systems in Millimeter Wave Channels." arXiv preprint arXiv:1607.01436 (2016). http://arxiv.org/pdf/1607.01436.

Björnson, Emil, "Massive MIMO for 5G." Tutorial at 2015 IEEE International Workshop SPAWC Stockholm Sweden Jun. 29 2015. https://pdfs.semanticscholar.org/85fc/19cd9a0090c4e32f5520d8edc86b592f5178.pdf.

Yang et al., "Joint Optimization of Transceiver Matrices for MIMO-Aided Multiuser AF Relay Networks: Improving the QoS in the Presence of CSI Errors." IEEE Transactions on Vehicular Technology 65.3 (2016): 1434-1451. http://eprints.soton.ac.uk/375505/1/tvt-hanzo-2410759-proof%20(1).pdf.

Niu et al., "A survey of millimeter wave communications (mmWave) for 5G: opportunities and challenges." Wireless Networks 21.8 (2015): 2657-2676.

Miao et al., "Self-organized multi-hop millimeter-wave backhaul network: Beam alignment and dynamic routing." Networks and Communications (EuCNC) 2015 European Conference on. IEEE 2015.

Vijayakumar et al., "Review on Routing Algorithms in Wireless Mesh Networks." International Journal of Computer Science and Telecommunications 3.5 (2012): 8792. http://www.ijcst.org/Volume3/Issue5/p15_3_5.pdf.

Bemmoussat et al., "Efficient routing protocol to support qos in wireless mesh network." International Journal of Wireless & Mobile Networks 4.5 (2012): 89. http://search.proquest.com/openview/be6898c2de82656d6aa1ae75b947ede0/1 ?pqorigsite= Gscholar.

Draves et al., "Routing in multiradio multihop wireless mesh networks." Proceedings of the 10th annual international conference on Mobile computing and networking. ACM 2004. http://www.cs.jhu.edu/~cs647/classpapers/ Routing/p114draves. Pdf.

Wazwaz et al., "Medium Access and Routing in Multi Hop Wireless Infrastructures." Univ. of Twente Enschede the Netherlands (2005). https://www.utwente.nl/ewi/dacs/assignments/completed/master/reports/thesi s_aymanwazwaz.pdf.

Hong, et al., "Applications of selfinterference cancellation in 5G and beyond." IEEE Communications Magazine 52.2 (2014): 114121. http://stevenhong. com/pubs/CommMag145G. pdf.

Hossain, Saddam, "5G wireless communication systems." American Journal of Engineering Research (AJER) e-ISSN (2013): 2320-0847. http://www.academia.edu/download/32242528/ZP210344353.pdf.

Osseiran, et al., "Scenarios for 5G mobile and wireless communications: the vision of the METIS project." IEEE Communications Magazine 52.5 (2014): 26-35. https://www.metis2020.com/wp-content/uploads/publications / IEEEComMag_Osseiran_et_al_METIS_overview_scenarios_201405.pdf.

Hu et al., "An energy efficient and spectrum efficient wireless heterogeneous network framework for 5G systems." IEEE Communications Magazine 52.5 (2014): 94-101. http://www.academia.edu/download/34030549 / An_Energy_Efficient_and_Spectrum_Efficient_Wireless_Heterogeneous_Network_Framework_for.

Wu, et al., "Recent advances in energy-efficient networks and their application in 5G systems." IEEE Wireless Communications 22.2 (2015): 145-151. https://www.researchgate.net/profile/Gang_Wu15/publication /275673965_Recent_advances_in_energyefficient_networks_and_their_application_in_5G_systems/links/559f3d1508ae03c44a5ce9ac.pdf.

Nakamura, et al., "5G radio access: Requirements, concept and experimental trials." IEICE Transactions on Communications 98.8 (2015): 1397-1406. https://pdfs.semanticscholar.org/68fa/40d96cf347627d2a2875777de3de1fb43223.pdf.

Kim, et al., "Interference Management via Sliding-Window Coded Modulation for 5G Cellular Networks." IEEE Communications Magazine, Nov. 2016, pp. 82-89, vol. 54, Issue 11, 8 pages.

International Search Report and Written Opinion for Application No. PCT/US2017/052582, dated Dec. 6, 2017, 16 pages.

Etri, "Potential CSI-RS and CSI feedback enhancements for EBF/FD-MIMO" 3GPP TSG RAN WG1 Meeting #19 San Francisco. USA, Nov. 11-21, 2014, 6 pages.

International Search Report and Written Opinion for Application No. PCT/US2017/052581 dated Nov. 24, 2017, 18 pages.

Nokia et al., "On System Design for Multiple Numerologies—Initial Access" 3GPP TSG-RAN WG1 #86, Gothenburg, Sweden, Aug. 22-26, 2016, 6 pages.

International Search Report and Written Opinion for Application No. PCT/US2017/052579, dated Jan. 2, 2018, 16 pages.

Qualcomm: "Forward compatibility considerations on NR Integrated Access and Backhaul", 3GPP Draft; R1-167119 3GPP TSG-RAN WG1 #86 Aug. 22-26, 2016, Gothenburg, Sweden, 5 pages.

CATT: "NR Frame Structure Design" 3GPP Draft R1-166472, 3rd Generation Partnership Project (3GPP), Mobile Competence Centre 650, Route Des Lucioles F-06921 Sophia-Antipolis Cedex France, Aug. 21, 2016, 8 pages.

NTT Docomo et al., "Workplan for Study on NR Access Technology" 3GPP Draft; R1-167373 Work Plan for Nr, 3GPP TSG RAN WG1 Meeting #86, Göteborg, Sweden Aug. 22-26, 2016, 30 pages.

Huawei, HiSilicon, AT&T, Samsung, Qualcomm, Ericsson, ASTRI, [ . . . ] "WF on Integrated Backhaul and Access", 3GPP Draft; R1-168429 3GPP TSG RAN WG1 Meeting #86 Gothenburg, Sweden, Aug. 22-26, 2016, 6 pages.

Invitation to Pay Additional Fees and, where Applicable, Protest Fee issued for Application No. PCT/US2017/052578 on Nov. 30, 2017, 18 pages.

Graffi et al., "Monitoring and Management of Structured Peer-to-Peer Systems", IEEE P2P'09—Sep. 9-11, 2009, pp. 311-320.

Acampora et al., "Control and Quality-of-Service Provisioning in High-Speed Microcellular Networks" IEEE Personal Communications, Second Quarter 1994, pp. 34-43.

Non-Final Office Action received for U.S. Appl. No. 15/376,137 dated Mar. 23, 2018, 38 pages.

International Search Report and Written Opinion received for PCT Application No. PCT/US2017/052578, dated Jan. 22, 2018, 20 pages.

Non-Final Office Action received for U.S. Appl. No. 15/432,515 dated Mar. 30, 2018, 48 pages.

Non-Final Office Action received for U.S. Appl. No. 15/376,377 dated Apr. 5, 2018, 43 pages.

Non-Final Office Action received for U.S. Appl. No. 15/340,744 dated Apr. 26, 2018, 51 pages.

Non-Final Office Action received for U.S. Appl. No. 15/376,209 dated May 1, 2018, 68 pages.

Non-Final Office Action received for U.S. Appl. No. 15/445,760 dated Apr. 30, 2018, 47 pages.

Notice of Allowance received for U.S. Appl. No. 15/445,760 dated Sep. 24, 2018, 29 pages.

Non-Final Office Action received for U.S. Appl. No. 15/340,744 dated Jun. 25, 2019, 32 pages.

Non-Final Office Action received for U.S. Appl. No. 16/174,854 dated Aug. 29, 2019, 48 pages.

Non-Final Office Action received for U.S. Appl. No. 16/238,067 dated Oct. 3, 2019, 60 pages.

Notice of Allowance received for U.S. Appl. No. 15/376,209 dated Nov. 14, 2019, 40 pages.

Notification of Reason for Refusal received for Korean Patent Application Serial No. 10-2019-7009108 dated Jan. 3, 2020, 8 pages (Including English Translation).

(56) References Cited

OTHER PUBLICATIONS

Communication pursuant to Article 94(3) EPC received for EP Patent Application Serial No. 17778094.7 dated Jan. 30, 2020, 4 pages.
Notice of Allowance received for U.S. Appl. No. 16/238,067 dated Feb. 6, 2020, 22 pages.
Communication pursuant to Article 94(3) EPC received for EP Patent Application Serial No. 17778093.9 dated Feb. 12, 2020, 10 pages.

* cited by examiner

Antenna port illustration for example with 4Tx in H and V domains and 2 Tx in U domain Antenna port illustration for two transmit/receive points, each having 2Tx in the H domain, 4 Tx in the V domain, and 2Tx in the U domain.

US 10,623,158 B2

CHANNEL STATE INFORMATION FRAMEWORK DESIGN FOR 5G MULTIPLE INPUT MULTIPLE OUTPUT TRANSMISSIONS

CROSS-REFERENCE TO RELATED APPLICATION

The subject patent application is a continuation of, and claims priority to, U.S. patent application Ser. No. 15/376,377 (now U.S. Pat. No. 10,171,214), filed Dec. 12, 2016, and entitled "CHANNEL STATE INFORMATION FRAMEWORK DESIGN FOR 5G MULTIPLE INPUT MULTIPLE OUTPUT TRANSMISSIONS," each of which applications claim priority to U.S. Provisional Patent Application No. 62/401,858, filed on Sep. 29, 2016, and entitled "Generic CSI Framework Design for 5G MIMO," and each of which applications are incorporated by reference herein in their respective entireties.

TECHNICAL FIELD

The present application relates generally to the field of wireless communication and more specifically to a Channel State Information (CSI) feedback framework for multiple input multiple output (MIMO) techniques, such as for 5G networks or other next generation networks.

BACKGROUND

Radio technologies in cellular communications have grown rapidly and evolved since the launch of analog cellular systems in the 1980s, starting from the first generation (1G) in the 1980s, second generation (2G) in the 1990s, third generation (3G) in the 2000s, and fourth generation (4G) in the 2010s (comprising variants of long term evolution (LTE) such as time division LTE (TD-LTE), frequency division duplex LTE (FDD-LTE), advanced extended global platform (AXGP), LTE advanced (LTE-A), and TD-LTE advanced (TD-LTE-A) and other releases). The amount of traffic in cellular networks has experienced a tremendous amount of growth and expansion, and there are no indications that such growth will decelerate. It is expected that this growth will include use of the network not only by humans, but also by an increasing number of machines that communicate with each other, for example, surveillance cameras, smart electrical grids, sensors, home appliances and other technologies in connected homes, and intelligent transportation systems (e.g., the Internet of Things (IOT)). Additional technological growth comprises 4K video, augmented reality, cloud computing, industrial automation, and voice to voice (V2V) communications.

Consequently, advancements in future networks are driven by the need to provide and account for massive connectivity and volume, expanded throughput and capacity, and ultra-low latency. Fifth generation (5G) access networks, which can also be referred to as New Radio (NR) access networks, are currently being developed and are expected to handle a very wide range of use cases and requirements, comprising, among others, mobile broadband (MBB) and machine type communications (e.g., involving IOT devices). For mobile broadband, 5G wireless communication networks are expected to fulfill the demand of exponentially increasing data traffic and to allow people and machines to enjoy gigabit data rates with virtually zero latency. Compared to existing fourth generation (4G) technologies, such as long-term evolution (LTE) networks and advanced LTE networks, 5G provides better speeds and coverage than the existing 4G network, targeting much higher throughput with low latency and utilizing higher carrier frequencies (e.g., higher than 6 gigahertz (Ghz)) and wider bandwidths. A 5G network also increases network expandability up to hundreds of thousands of connections.

The present patent application provides for a very flexible and adaptable MIMO framework for 5G systems that can be adapted for use for both mmWave (>6 GHz) as well as for sub 6 GHz, thereby providing a unified framework for all 5G systems.

The above-described background relating to wireless networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
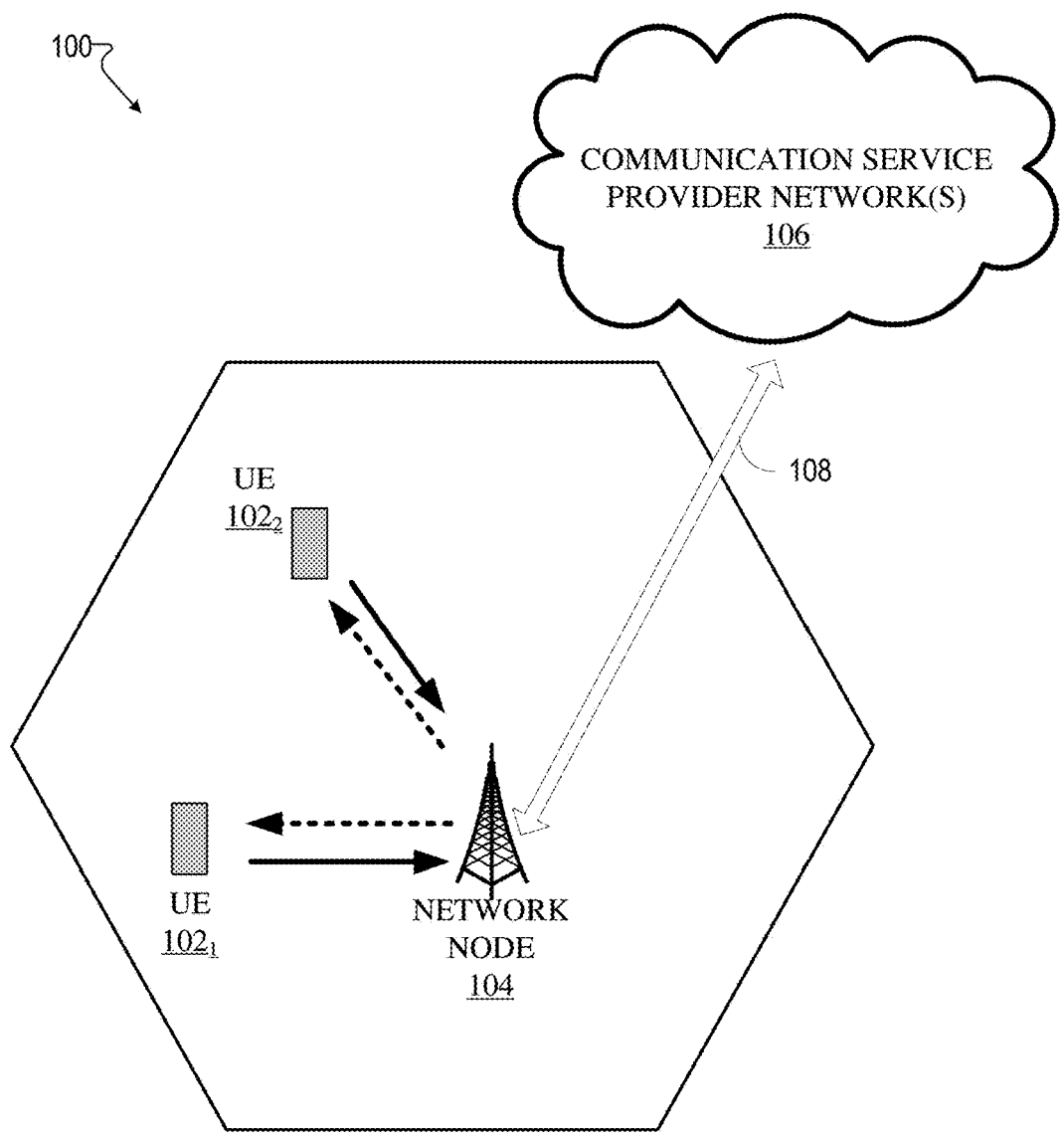
FIG. 1 illustrates an example wireless communication system in which a network node and user equipment (UE) can implement various aspects and embodiments of the subject disclosure.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure can be practiced without these specific details. In other instances, well-known structures and devices are shown in block diagram form in order to facilitate describing the subject disclosure.

The subject disclosure of the present application describes systems and methods (comprising example computer processing systems, computer-implemented methods, apparatus, computer program products, etc.) for decomposing a multiple input multiple output (MIMO) channel into multiple domains, selecting a feedback format based on a channel state information reference signal (CSI-RS) transmitted, and using the feedback provided to determine a transmission parameter. The methods (e.g., processes and logic flows) described in this specification can be performed by devices (e.g., a UE, a network node, etc.) comprising programmable processors that execute machine executable instructions to facilitate performance of the operations described herein. Examples of such devices can be devices comprising circuitry and components as described in FIG. 9 and FIG. 10.

FIG. 1 illustrates of an example wireless communication system 100 in accordance with various aspects and embodiments of the subject disclosure. In example embodiments, system 100 is or comprises a wireless communication network serviced by one or more wireless communication network providers. In example embodiments, system 100 can comprise one or more user equipment (UEs) 102 (e.g., 102$_1$, 102$_2$ . . . 102$_n$), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node (e.g., network node device) provides connectivity between the UE and the wider cellular network and facilitates wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), they can be referred to as base transceiver stations (BTS), radio base station, radio network nodes, base stations, NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

System 100 can further include one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular technologies and modulation schemes to facilitate wireless radio communications between devices (e.g., the UE 102 and the network node 104). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, and resource-block-filtered OFDM. However, various features and functionalities of system 100 are particularly described wherein the devices (e.g., the UEs 102 and the network device 104) of system 100 are configured to communicate wireless signals using one or more multi-carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi-carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE The upcoming 5G access network can utilize higher frequencies (e.g., >6 GHz) to aid in increasing capacity. Currently, much of the millimeter wave (mmWave) spectrum, the band of spectrum between 30 Ghz and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance between a network node and UE can be improved if both the transmitter and the receiver are equipped with multiple antennas. Multi-antenna techniques can significantly increase the data rates and reliability of a wireless communication system. The use of MIMO techniques can improve mmWave communications. MIMO, which was introduced in the third generation partnership project (3GPP) and has been in use (including with LTE), involves the use of multi-antenna techniques comprising multiple transmit and multiple receive antennas in both transmission and receiver equipment for wireless radio communications. It has been widely recognized as one important component for access networks operating in higher frequencies. In addition to transmit diversity (or spatial diversity), other techniques such as spatial multiplexing (comprising both open-loop and closed-loop), beamforming, and codebook-based precoding also address communication issues such as efficiency, interference, and range.

In one technique, the UE can send a reference signal back to the network node. The network node takes a received reference signal from the UE, estimates the condition of the channel, which can be influenced by various factors, such as objects in the line of sight, weather, movement, interference, etc., and after correcting for more issues (e.g., interference), adjusts the beamforming rates for each antenna transmitting to the UE, and changes parameters, so as to transmit a better beam toward the UE. This ability to select MIMO schemes and use beamforming to focus energy and adapt to changing channel conditions can allow for higher data rates.

Figure 2:
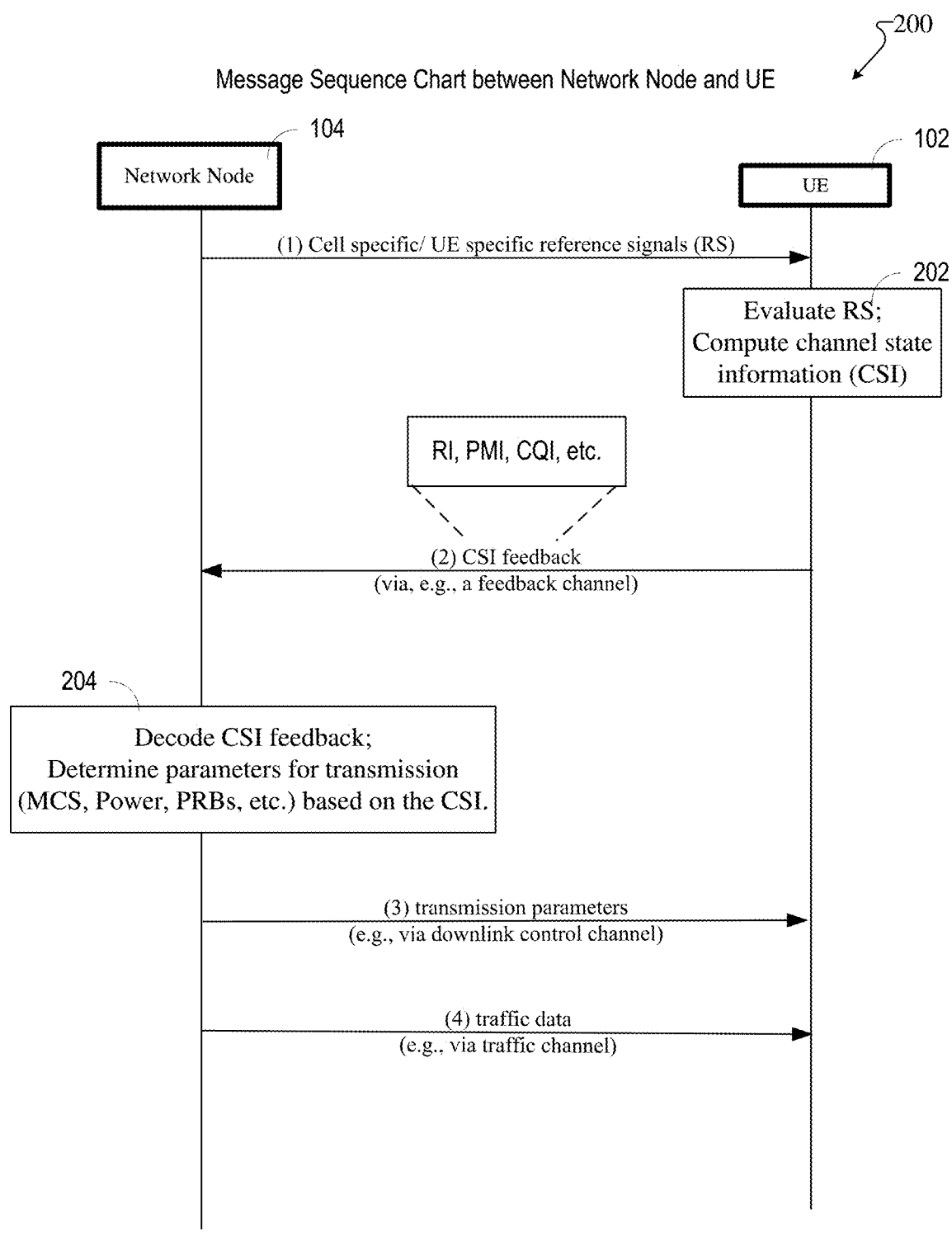
FIG. 2 illustrates a message sequence chart between a network node and UE in a typical LTE network.

FIG. 2 depicts a sequence chart 200 for another example of a typical scheme, wherein a user equipment (e.g., UE 102) can determine transmission parameters from evaluating a reference signal from a network node (e.g., network node 104), estimate the channel characteristics, and send CSI feedback back to the network node. The network node 104 then processes the feedback and adjusts the rates and phase shifts for each of its antenna elements and sends an array of signals that focuses the wavefront in the direction of the UE 102, thereby allowing a higher data rate to the UE 102.

In FIG. 2, network node 104 can transmit a reference signal (RS) at transaction (1), which can be beam formed or non-beam formed, to UE 102. The reference signal can be cell specific or demodulation reference signals (e.g., user equipment specific reference signals) in relation to a profile of the UE 102 or some type of mobile identifier. CSI reference signals (CSI-RS) are specifically intended to be used by terminals to acquire channel-state information (CSI) and beam specific information (beam RSRP). Demodulation reference signals (DM-RS) are specifically intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

After receiving this reference signal, at block 202, the UE 102 can evaluate the reference signal and compute CSI, which can be transmitted to the network node as CSI feedback (e.g., a CSI report). The CSI feedback can comprise: an indicator of channel quality (e.g., channel quality indicator (CQI) in LTE terminology), an indicator of CSI (e.g., precoding matrix indicator (PMI) in LTE terminology), an indicator of the rank (e.g., Rank Indicator in LTE terminology), the best sub-band indices, best beam indices, etc.

The indicator of channel quality can be, for example, CQI, which can relate to the quality of the channel between the network node and the UE.

The indicator of CSI (e.g., PMI) can be used for selection of transmission parameters for the different data streams transmitted between the network node and the UE (e.g., the indicator of CSI can be similar to what is referred to in LTE as the precoding matrix indicator PMI and can be used in a similar manner). In techniques using codebook-based precoding, the network node and UE uses different codebooks, which can be found in standards specifications, each of which relate to different types of MIMO matrices (for example, a codebook of precoding matrices for 2×2 MIMO). The codebook is known (contained) at the base station and the UE site, and can contain entries of precoding vectors and matrices, which are multiplied with the signal in the precoding stage of the network node. The decision as to which of these codebook entries to select is made at the network node based on CSI feedback provided by the UE, because the CSI is known at the receiver, but not at the transmitter. Based on the evaluation of the reference signal, the UE transmits feedback which comprises recommendations for a suitable precoding matrix out of the appropriate codebook. This UE feedback identifying the precoding matrix is called the pre-coding matrix indicator (PMI), wherein the UE is pointing to one of these codebook entries. The UE is thus evaluating which pre-coding matrix would be more suitable for the transmissions between the network node and UE.

Also included in the CSI feedback is the rank indicator (RI) which provides an indication of the rank of the channel matrix, wherein the rank is the number of different transmission data streams (layers) transmitted in parallel (in other words, the number of spatial layers) between the network node and the UE. The RI determines the format of the rest of the CSI reporting messages. As an example, in the case of LTE, when RI is reported to be 1, the rank 1 codebook PMI will be transmitted with one CQI, and when RI is 2, a rank 2 codebook PMI and two CQIs will be transmitted. Since the RI determines the size of the PMI and CQI, it is separately encoded so the receiver can firstly decode the RI, and then use it to decode the rest of the CSI (which as mentioned, comprises the PMI and CQI, among other information).

Still referring to FIG. 2, after computing the CSI feedback, the UE 102 can transmit the CSI feedback at transaction (2), via a feedback channel, which can be a channel separate from the channel from which the reference signal was sent. The network node can process the CSI feedback to determine transmission scheduling parameters (e.g., downlink (DL) transmission scheduling parameters), which comprise a modulation and coding parameter applicable to modulation and coding of signals by the network node device particular to the UE 102.

This processing of the CSI feedback by the network node 104, as shown in block 204 of FIG. 2, can comprise decoding the CSI feedback. The UE can decode the RI and then use the decoded information (for example, the obtained size of the CSI) to decode the remainder of the CSI (e.g., the CQI, PMI, etc.). The network node 104 uses the decoded CSI feedback to determine the transmission parameters, which can comprise modulation and coding schemes (MCS) applicable to modulation and coding of the different transmissions between the network node 104 and the UE 102, power, physical resource blocks (PRBs), etc.

The network node 104 can transmit the parameters at transaction (3) to the UE 102 via a downlink control channel Thereafter and/or simultaneously, at transaction (4), traffic data (e.g., non-control data such as data related to texts, emails, pictures, audio files videos, etc.) can be transferred, via a data traffic channel, from the network device 104 to the UE 102.

Of note, LTE has multiple MIMO transmission modes with several CSI feedback modes, but these feedback modes are based on the evaluation of the whole MIMO channel. In the LTE CSI feedback framework, CSI-RS configuration, measurement, CSI reporting, and the scheduled multi-antenna scheme are tightly coupled under the umbrella of transmission mode. Also, the LTE codebook is designed to a specific antenna design (co-located 2D planar array), and thus does not necessarily account for various other antenna configurations. The GOB (grid of beam) based design is suited well for environments with low scattering, but not others. Incorporating MU (multiple user) centric feedback can be tedious, and the RS design is not scalable, especially as the number of CSI-RS ports increase, depending on the number of antennas.

In example embodiments in accordance with this patent application, there is provided a CSI feedback framework that takes into account the Horizontal, Vertical, and Uncorrelated domains of a MIMO channel In this framework, instead of evaluating the MIMO channel as a whole, the general MIMO channel is decomposed into 3 domains based on the structure of the channel co-variances (determined by the antennas at the network node). These channel co-variances are the channel co-variance in the horizontal domain (H domain), the channel co-variance in the vertical domain (V domain) and the channel co-variance in the uncorrelated domain (U domain) The H and V domain can be used to describe the channel co-variance between correlated antennas comprising horizontal and vertical elements on an antenna panel, while the U domain can be used to describe the co-phasing between multiple antennas sub-groups such as sub-panels and/or polarization. Each domain characterizes how the pre-coding matrix indicator (PMI) changes (in time and frequency) and the type of precoders that might be better suited. The H, V, and U domain are identified by the structure of the channel covariance as:

$$E\{H^*H\} = \Phi = \Phi_V \otimes \Phi_H \otimes \Phi_U$$

$$\Phi_V \approx \begin{bmatrix} 1 & \phi_V \\ \phi_V & 1 \end{bmatrix}^{\otimes\left(\frac{N_V}{2}\right)}$$

$$\Phi_H \approx \begin{bmatrix} 1 & \phi_H \\ \phi_H & 1 \end{bmatrix}^{\otimes\left(\frac{N_H}{2}\right)}$$

$$\Phi_U \approx I_{N_U}$$

In the equation above, $N_V$, $N_H$, and $N_U$ is the number of degrees of freedom in the H, V, and U domain. Also, $N_V \times N_H \times N_U$ is equal to the total number of transmit antennas (e.g., Tx, although it is also noted that the antennas can also receive, and thus can also be abbreviated TxRx). The CSI feedback in the three domains characterize the co-variance of the MIMO channel matrix, which is highly related to the antenna structure (particularly the correlation between antenna elements) as well as the channel angular spread. For different domains, the CSI feedback type and quantization method could be different in that the H and V domains represent the channel response between antennas within correlated distance; or the U domain is about the channel between uncorrelated antennas (e.g., antennas in different sub-panels, different cross-polarizations, or even different transmit-receive points (TRPs)).

An example of CSI feedback for each domain can be as follows: wideband discrete Fourier transform (DFT) based precoders with long term feedback are better suited for the H and V domains (e.g., allocate a few bits to this domain); or sub-band Grassmannian Line Packing/Random Vector Quantization (GLP/RVQ) precoders with short term feedback are better suited for the U domain (e.g., allocate more bits to this domain). Also, the feedback format and payload bits for the H and V domains can be different. For example, if an antenna panel has a large number of horizontal antenna elements, while also comprising few vertical antenna elements, then the H feedback needs more feedback bits than the V feedback, even though they are both using the DFT codebook.

Figure 3A:
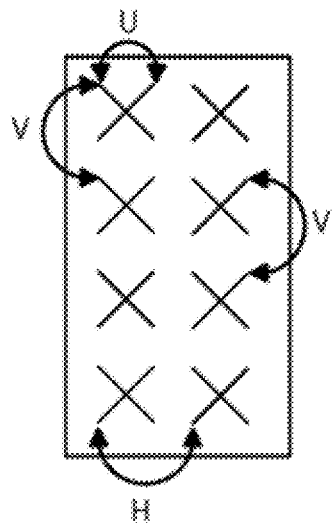
FIGS. 3A, 3B, and 3C illustrate various configurations of antenna panels, wherein each antenna panel can have different correlations in the H and V domains.
Figure 3B:
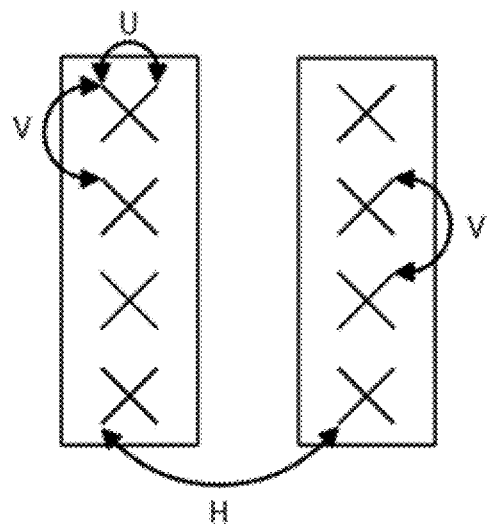
Figure 3C:
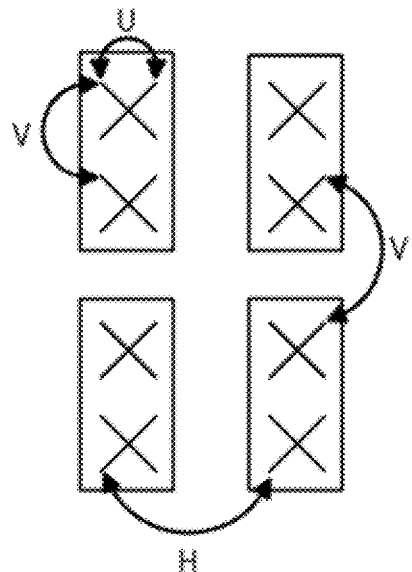

FIGS. 3A, 3B, and 3C shows examples of three antenna configurations, labeled as FIG. 3A, FIG. 3B, and FIG. 3C. FIG. 3A depicts an antenna panel comprising a 2×4×2 configuration, wherein the panel comprises two elements in each horizontal, four elements in each vertical, and two polarizations (e.g., between two sub-elements of each element). Referring to FIGS. 3A, 3B, and 3C, the V domain accounts for the correlation of the vertical sub-elements in the same direction (e.g., at the same angle), the H domain accounts for the correlation of horizontal sub-elements in the same direction (e.g., at the same angle). In FIG. 3A, the horizontal elements maintain correlation and thus, can be allocation bits when determining a feedback format.

In FIG. 3B, two antenna panels, each being a 1×4×2 (1 horizontal element, 4 vertical elements, two U domain sub-elements). Here, the H domain becomes less correlated (e.g., becomes more uncorrelated), due to the increased distance between each element in the horizontal, and thus a feedback format can be selected in which the H domain is allocated less bits.

In FIG. 3C, an antenna array configuration comprising four panels is depicted, wherein each panel comprises a 1×2×2 (1 horizontal, 2 vertical, and 2 U). Here, the vertical and horizontal domains both lose some correlation, on account of the distance between the antenna panels, and thus the antenna elements.

A user equipment (e.g., UE 102) can firstly decompose the MIMO channel into Horizontal, Vertical and Uncorrelated domains, wherein physical configuration of the antennas can influence the channel condition in each of the H, V, and U domains. In this framework, the network node (e.g., network node 104, which can be a gNB node) configures the UE to measure different sets of CSI-RS resources for each domain. The CSI-RS resource is the location of the channel state reference information reference signal (CSI-RS) for all the ports in the time-frequency grid of the OFDM (orthogonal frequency division multiplexing) signal. The UE should know where the N CSI-RS are located, where N is the number antennas the UE is measuring. Without this knowledge the UE would not know where to look for these signals. Note that the time-frequency granularity of the different CSI-RS for the different domains can be different (e.g., a denser RS for one domain compared to others). The CSI-RS (CSI reference signal) is a reference signal (RS) that is used for measuring CSI. In a multi-antenna system, there can be one CSI-RS per antenna port that the receiver needs to measure. So, if the receiver needs to measure eight antenna ports then 8 RS can be employed.

The network node further configures several candidate feedback formats from which the UE may select. The feedback format is an indicator of how the various components of the CSI (CQI, rank, beamforming weights, etc.) are to be sent as feedback. Typically, the configured candidate feedback formats have a similar number of total load bits such that all the feedbacks can fit in the same upstream link (UL) feedback channel. A feedback format in this context comprises CSI formats in each domain and/or CQI to be included. The feedback format can also indicate which of the domains has sub-band feedback and which has wideband feedback. The channel quality information can be associated with a transmission hypothesis (that is assuming that this is the transmission scheme—calculate the channel quality based on this assumption). Table 1 below shows an example of one such feedback format:

TABLE 1

Example Feedback Format

| | | |
|---|---|---|
| Feedback Format | H domain (4 CSI-RS ports) | wideband 2 bits PMI based on DFT codebook (small oversampling rate) |
| | V domain (4 CSI-RS ports) | wideband 4 bits PMI based on DFT codebook (larger oversampling rate) |
| | U domain (matrix size 1*2) | Subband (subband size = 4 PRB) 2 bits PMI based on co-phase rank = 1 codebook |
| | CQI | subband 4 bits CQI report, wherein the transmission hypothesis is close loop MIMO using the PMI report from U, V, U domain. $E\{H^H H\} = \Phi = \Phi_V \otimes \Phi_H \otimes \Phi_U$ |

Once triggered (e.g., by the transmission of CSI-RS), the UE can measure the CSI-RS resources configured for each domain and select a CSI feedback format from a candidate set configured by the network node beforehand (and sent to the UE). When providing the feedback CSI, the UE reports the index (e.g., format index) of selected CSI format, followed by payload of the CSI feedback. The selected feedback format can be indicated to the gNB together with the payload bits but with a separate encoding. Thus, the gNB can decode the format index to understand the format of actual payload bits. The final feedback can comprise the format index, and also the feedback payload bits.

Thus, the MIMO channel can be divided into three domains, wherein each domain has its own CSI-RS resource (e.g., configured by the network node). This framework can involve less overhead than selecting a joint CSI-RS resource for the whole MIMO channel, can give a UE a certain degree of freedom to select a better feedback from the candidate set of feedback formats provided by the network node (e.g., the gNB), and thusly, can increase the feedback efficiency as it can adjust the feedback payload bits between different domains as needed. This framework also can be easily extended to support multi-transmit receive point coordinate multi-transmission (e.g., multi-TRP CoMP) scenarios.

Figure 4:
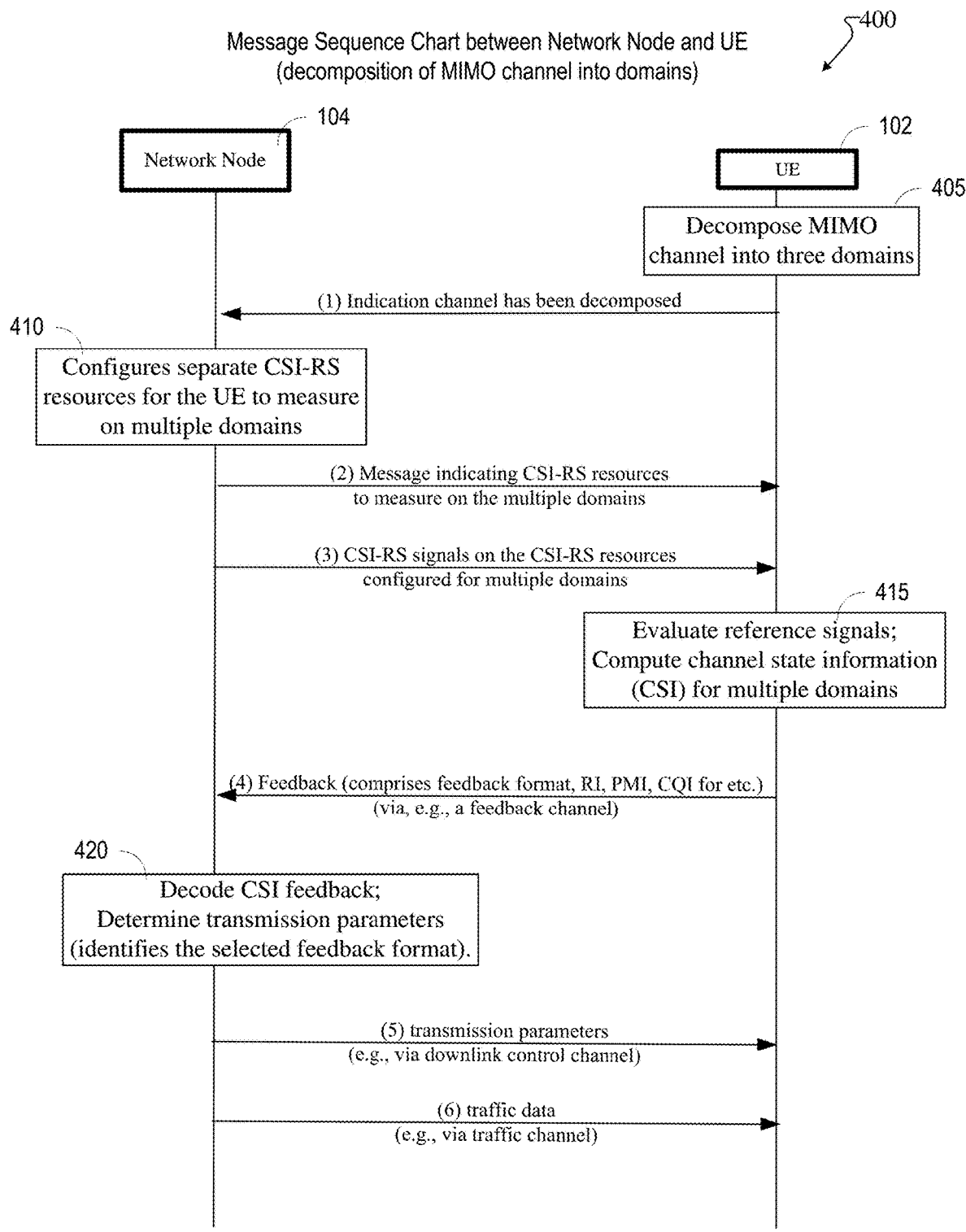
FIG. 4 illustrates an example schematic system block diagram of a message sequence chart between a network node and UE, in accordance with various aspects and embodiments of the subject disclosure, wherein a multiple input multiple output (MIMO) channel can be decomposed into multiple domains.

In accordance with example embodiments in which a MIMO channel between a network node and UE can be decomposed into horizontal, vertical, and uncorrelated domains, FIG. 4 illustrates a sequence chart 400 between a network node (e.g., network node 104) and UE (e.g., UE 102).

At block 405, the UE 102 decomposes a MIMO channel into three domains. The UE 102 receives and evaluates the full CSI-RS (wherein each TRX, or antenna element, of the network node 104 uses a different CSI-RS and exposes the whole channel to the UE) over time to determine the decomposition.

At transaction (1) of sequence chart 400, the UE 102 can transmit a message to the network node 104 indicating that UE 102 has decomposed the MIMO channel into multiple domains. Optionally, the UE 102 can also send some indication of how many bits from the total number of feedback bits it might want to reserve for each domain.

After receiving from the UE 102 the message indicating that the UE 102 has decomposed the MIMO channel into multiple domains, at block 410 the network node 104 (e.g., a gNB) can configure separate CSI-RS resources for the UE 102 to measure on each of the multiple domains.

The network node 104 at transaction (2) of sequence chart 400 transmits a message to the UE 102 indicating the CSI-RS resources for the UE 102 to measure on the multiple domains (e.g., the UE 102 can be given an indication as to which domains to listen to when reference signals are transmitted to it). The network node 104 can configure one CSI-RS resource for each domain. The CSI-RS resources indicated would be dependent on the configuration of the antenna(s) at the network node 104. The time-frequency granularity of the different CSI-RS for the different domains can be different (e.g., a denser RS for one domain compared to others). This transmitted message can be in the form of, for example, an RRC (radio resource controller) configuration message. This RRC message can also contain the feedback format, or a set of feedback formats, from which the UE 102 selects. The configured candidate feedback format can have similar total load bits, so that all the feedbacks can fit in the same uplink (UL) feedback channel. A feedback format in this context comprises CSI formats in each domain and/or CQI to be included, wherein the channel quality information can be associated with a transmission hypothesis (e.g., assuming that this is the transmission scheme—calculate the channel quality based on this assumption).

The network node 104 (e.g., gNB) can at transaction (3) transmit the CSI-RS on the CSI-RS resources configured for each domain. Each domain might be sent independent of each other and their timings might not be related. These reference signals can be beam formed or non-beam formed, and can be cell specific or demodulation reference signals (e.g., UE specific reference signals).

At block 415, the UE measures the CSI-RS for each one of the multiple domains based on the CSI-RS resource configurations received from the network node 104. The UE computes the CSI, and selects a feedback format (examples of which will be described below), wherein the feedback format comprises CSI related to each domain (e.g., indication of rank (RI), an indicator of channel quality (e.g., CQI in LTE), an indicator of CSI (e.g., PMI in LTE), the best sub-band indices, best beam indices, etc.)

Still referring to FIG. 4, the UE 102 at transaction (4) sends feedback to the network node 104. The feedback contains the selected feedback format, which comprises CSI. The feedback can be a full feedback (e.g., all the domains and rank and CQI all together), or it can be a partial feedback, in which case only a subset of the domain might be sent (this can depend on the feedback format). The selected feedback format can be indicated to the network node 104 in the form of a format index, and sent together with the payload bits (the payload bits comprising a separate encoding).

At block 420, the network node 104 can receive the feedback containing the feedback format comprising CSI feedback for the multiple domains from the UE 102. The transmission parameters for transmissions to the UE 102 can be determined for each domain based on the decoded feedback, which can comprise modulation and coding schemes (MCS) applicable to modulation and coding of the different transmissions between the network node and the UE, power, physical resource blocks (PRBs), etc. The network node 104 can decode the format index to understand the format of the actual payload bits.

After using the decoded feedback to determine the transmission scheduling parameters, which are now more domain-specific, the network node 104 can transmit the scheduling parameters to the UE 102 via a downlink control channel at transaction (5).

Thereafter, at transaction (6) the network node 104 can begin transmitting traffic data (e.g., non-control data such as texts, emails, pictures, movies, etc.) via a data traffic channel to the UE 102.

Figure 5:
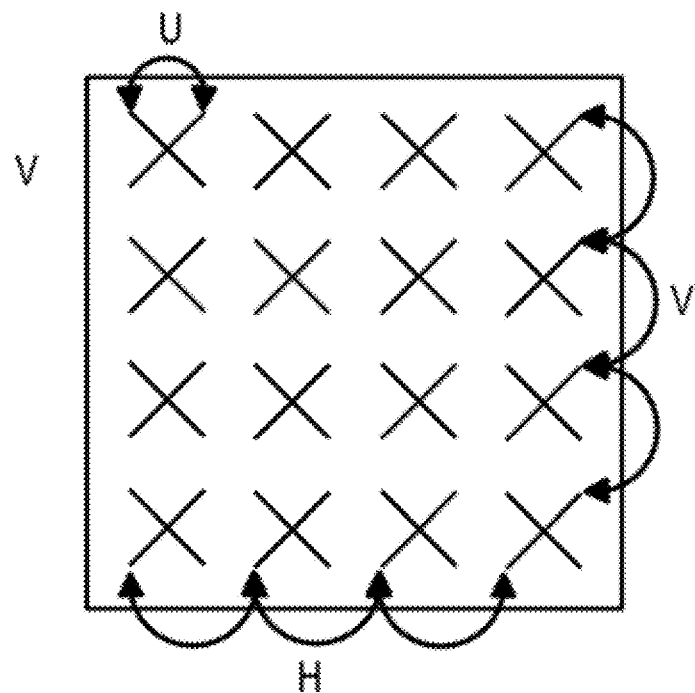
FIG. 5 illustrates an antenna panel comprising four transmitters in the H and V domain and two transmitters in the U domain.

FIG. 5 relates to an example of a case employing basic MIMO feedback with adaptive feedback overhead in different domains, wherein a network node antenna has a 4×4×2 configuration. For this panel, the network node (e.g., network node 104, which can be a gNB) can configures 4Tx CSI-RS in H domain and V domain separately. And 2Tx CSI-RS port in U domain (2 Polarizations), wherein the antenna ports are illustrated in FIG. 5. The various feedback formats that the UE can select from are listed below. As can be seen in Table 2, even with the same antenna configuration, several example formats can be selected, depending on the conditions of the MIMO channel's multiple domains. It is noted that the UE may choose one of the following feedback formats, depending on which one is more suitable.

TABLE 2

Feedback Formats for basic MIMO feedback with adaptive feedback overhead in different domains

| | | |
|---|---|---|
| Format-1 (High resolution V domain feedback + Low resolution H domain) | H domain | wideband 2 bits PMI using DFT codebook (with smaller oversampling rate) |
| | V domain | wideband 4 bits DFT codebook (with Oversampling rate); |
| | U domain (matrix size 1*2) | wideband 2 bits PMI based on rank = 1 codebook |
| | CQI | wideband 4 bits CQI report assuming $P = P_V(p_v) \otimes P_H(p_h) \otimes P_G(p_g)$ |
| Format-2 (High resolution H and V domain feedback for digital beam management) | H domain | wideband 8 bits PMI using DFT codebook (with smaller oversampling rate) |
| | V domain | wideband 8 bits PMI using DFT codebook (with smaller oversampling rate |

TABLE 2-continued

Feedback Formats for basic MIMO feedback with adaptive feedback overhead in different domains

| | | |
|---|---|---|
| | U domain | no feedback |
| | CQI | no CQI feedback. |
| Format-3 (Rank-2 feedback) | H/V domain | Skip PMI report (Reuse previous reported H, and V domain PMI). |
| | U domain (matrix size 2*2) | subband (UE selected best subband, L bits to indicate the subband index) 2 + 2 + L bits PMI based on co-phase codebook |
| | CQI | subband 4 bits CQI report assuming $P = P_V(p_v) \otimes P_H(p_h) \otimes P_G(p_g)$ |
| Format-4 (High resolution channel quality information) | H/V domain | skip PMI report (Reuse previous reported H, and V domain PMI). |
| | U domain (matrix size 1*2) | Wideband 2 bits PMI based on rank = 1 codebook |
| | CQI | subband High resolution L + 10 quantization bits for received signal and Interference separately: assuming $P = P_V(p_v) \otimes P_H(p_h) \otimes P_G(p_g)$ for calculating S. |
| Format-5 (Physical layer feedback for analog beam management) - The UE may select this format when the UE determines the need to refine the analog beam | H domain | Index of the strongest N beams, and corresponding RSRP (reference signal received power) for the strongest N beams. Note: The UE may assume a different CSI-RS resource is located at different analog beams. |

Figure 6:
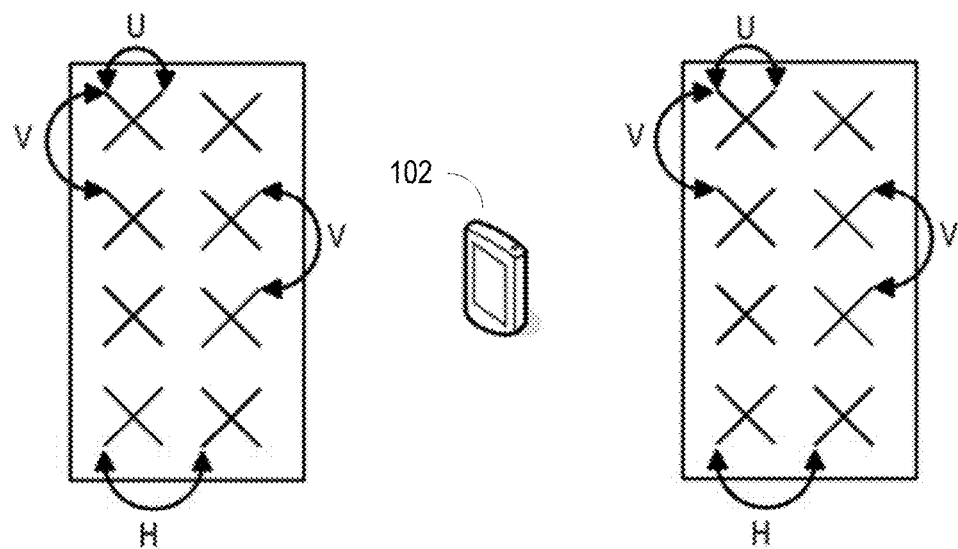
FIG. 6 illustrates two transmit-receive points (TRPs) operable to communicate with a user equipment.

FIG. 6 relates to an example of a case comprising distributed MIMO coordinate multipoint (CoMP) feedback, wherein a UE device 102 can receive signals from two TRPs (Transmit and Receive Points). For each TRP, the network node 104 can configure 2Tx CSI-RS in the H domain, 4Tx in the V domain, and 2Tx CSI-RS ports in the U domain (2 polarizations). The antenna ports are illustrated in FIG. 6. Several example feedback formats can be selected by a UE, based on its measurements of the CSI-RS for the multiple domains, as shown in Table 3 below:

TABLE 3

Distributed MIMO (CoMP) Feedback

| | | |
|---|---|---|
| Format-1 (Non-coherent join transmission (JT), Rank = 1) | H domain | wideband 2 bits PMI for TRP-1 and TRP-2 separately using DFT codebook |
| | V domain | wideband 4 bits DFT codebook shared by both TRP-1 and 2 |
| | U domain (matrix size 1*2) | Wideband 2 bits PMI based on rank = 1 codebook for each TRP; |
| | CQI | Wideband 4 bits CQI report assuming: $P = [P_V(p_v) \otimes P_H(p_{h1}) \otimes P_G(p_{g1}), P_V(p_v) \otimes P_H(p_{h2}) \otimes P_G(p_{g2})]$ |
| Format-2 (Dynamic Point Selection, Rank = 1) | H domain | wideband 2 bits PMI for both TRP-1 and TRP-2 using DFT codebook |
| | V domain | wideband 4 bits DFT codebook for both TRP-1 and 2 |
| | U domain (matrix size 1*2) | Wideband 2 bits PMI based antenna selection codebook (selecting antennas from one of the TRPs) |
| | CQI | Wideband 4 bits CQI report assuming $P = P_V(p_v) \otimes P_H(p_h) \otimes P_G(p_g)$ |
| Format-3 (Dynamic Point Selection, Rank = 2); | H domain, V domain | Same as above for Format-2 |
| | U domain (matrix size 2*2) | wideband 4 bits PMI on antenna selection |
| | CQI | Same as above for Format-2 |
| Format-4 (Coordinated Scheduling, Rank = 1) | H domain, V domain, U domain (matrix size 2*2) | Same as above for Format-2 |
| | CQI | Same as for Format-2, except some interference from certain cells can be excluded |

Note that for feedback Format-3, the UE can select different TRPs for different layers: the antenna from TRP-1 for the first layer, and the antenna from TRP-2 for the second layer.

Thus, several feedback formats can be configured for various antenna configurations.

In accordance with example embodiments, a network node and UE can be operable to perform example methods, as illustrated below in flow diagrams as described in FIG. 7 and FIG. 8 below.

Figure 7:
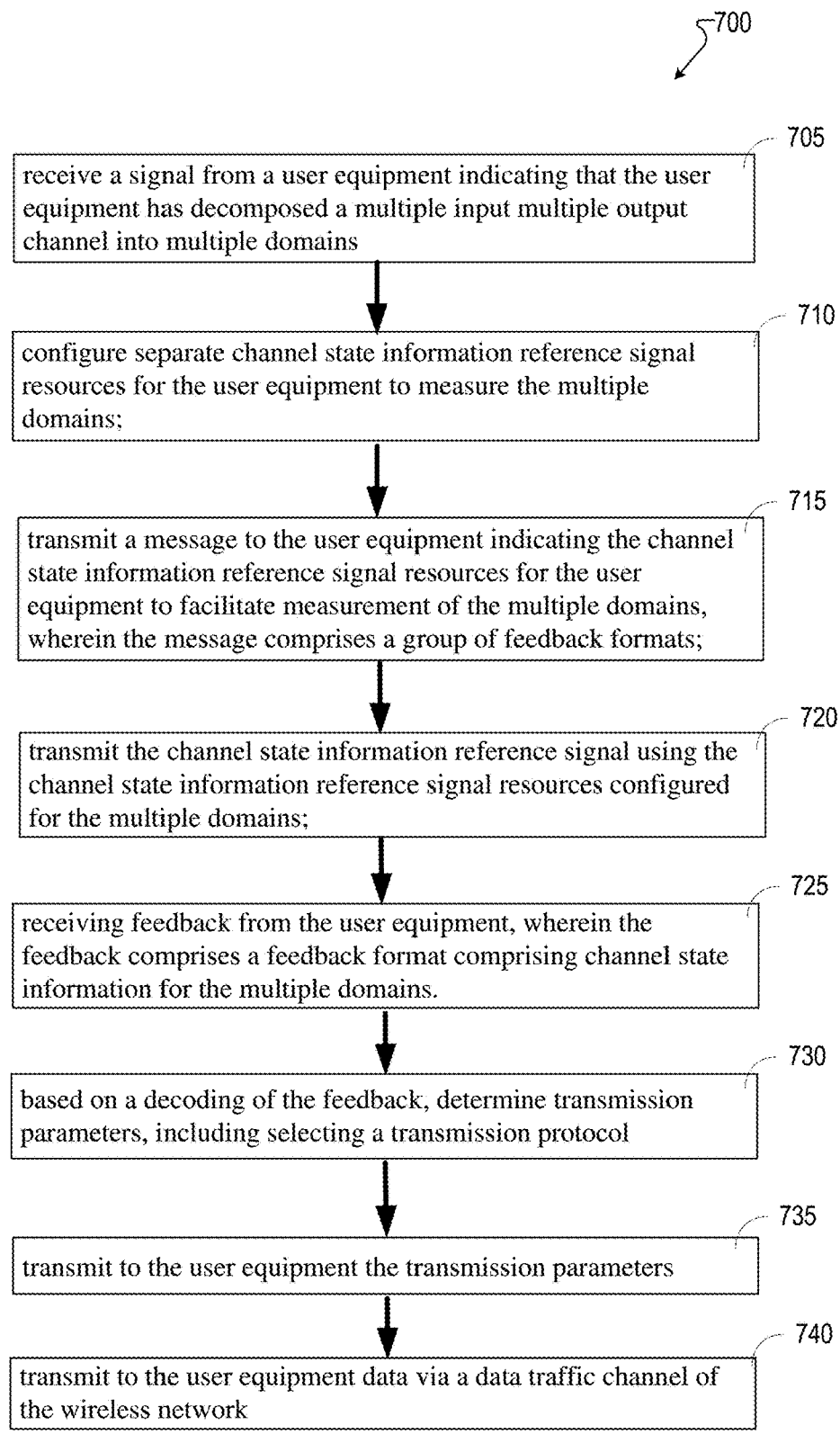
FIG. 7 illustrates an example method that can be performed by a network node in accordance with various aspects and embodiments of the subject disclosure.

FIG. 7 is a flow diagram 700 illustrating an example method, which can be performed by a network node (e.g., network node 104), for interacting with a UE (e.g., UE 102) to processing CSI related to multiple domains. The method can begin at step 705, wherein the network node 104 can receive a signal from a UE 102 indicating that the UE has decomposed a multiple input multiple output channel into multiple domains (e.g., the H, V, and U domains).

At step 710, the network node 104 can configure separate CSI-RS resources for the UE to measure the multiple domains.

The network node 104 at step 715 can then transmit a message to the UE indicating the CSI-RS resources for the UE to facilitate measurement of the multiple domains. The UE can thus be instructed as to which domains to listen and evaluate when the CSI-RS is sent to the UE 102. Here, the message can also comprise a group of feedback formats.

At step 720, the network node 104 can transmit the CSI-RS on the CSI-RS resources configured for each domain (e.g., using the CSI-RS resources configured for the multiple domains). Once triggered (e.g., by the CSI reference signal), the UE can measure the CSI-RS for each one of the multiple domains based on the CSI-RS resource configurations received from the network node. The UE computes the CSI, and selects a feedback format, wherein the feedback format comprises CSI related to each domain.

At step 725, the network node 104 can receive feedback from the UE, wherein the feedback comprises a feedback format comprising CSI for the multiple domains. This information can include indication of rank (e.g., RI in LTE), indicator of quality (e.g., CQI in LTE), and indicator of CSI (e.g., PMI in LTE).

At step 730, the network node 104 can, based on a decoding of the feedback, determine transmission parameters, comprising selecting a transmission protocol.

Once the transmission parameters have been determined the network node can, at step 735, transmit the parameters to the UE 102.

At step 740, the network node 104 can transmit data traffic to the UE 102 on the channel that now can take into account the channel condition for the multiple domains.

Figure 8:
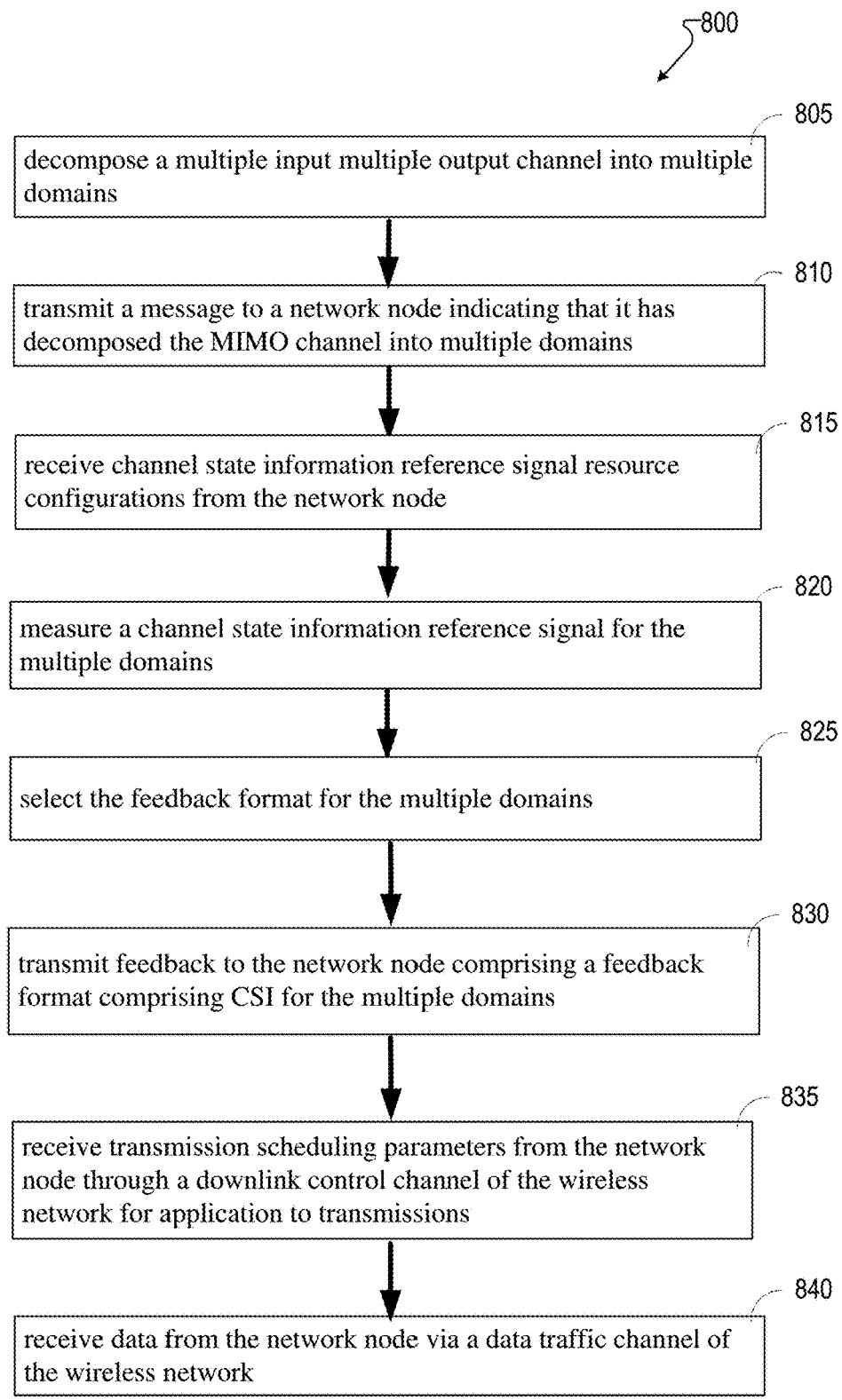
FIG. 8 illustrates an example method that can be performed by a UE in accordance with various aspects and embodiments of the subject disclosure.

FIG. 8 illustrates a flow diagram 800 of an example method performed by a user equipment (e.g., UE 102) that interacts with a network node 104 to configure and receive transmissions that take into account the channel conditions for multiple domains (e.g., H, V, and U domains).

The method can begin at step 805, wherein the UE 102 can decompose a MIMO channel into multiple domains.

At step 810, the UE 102 can transmit a message to the network node 104 indicating that it has decomposed the MIMO channel into multiple domains. Once the network node 104 receives the message, it can then configure separate CSI-RS resources for the UE 102 to measure on the multiple domains. The base station then transmits a message to the UE 102 indicating the CSI-RS resources for the UE to measure on the multiple domains. This message can be, for example, an RRC (radio resource controller) configuration message. This RRC message can also contain the feedback format, or a set of feedback formats, from which the UE 102 selects.

The UE 102 at step 815 can receive the CSI-RS resource configurations from the network node 104. The network node 104 can transmit the CSI-RS on the CSI-RS resources configured for each domain.

At step 820, the UE 102 can measure (e.g., evaluate) the CSI-RS for the multiple domains.

At step 825, the UE 102 can, based on its measurements, determine the CSI for the multiple domains, and select a feedback format, which can be selected from the group sent by the network node 104, for the multiple domains.

The UE 102 can then, at step 830, transmit feedback to the network node 104, wherein the feedback comprises the feedback format selected. The feedback format can contain the CSI for each domain. Once the network node 104 receives feedback, it can determine the transmission parameters for transmissions between the network node 104 and the UE 102.

At step 835, the UE 102 can receive transmission scheduling parameters from the network node (for example, through a downlink control channel of the wireless network). At step 840, the UE 102 can receive data from the network node 104 in accordance with the transmission parameters, which now better account for the multiple domains.

Figure 9:
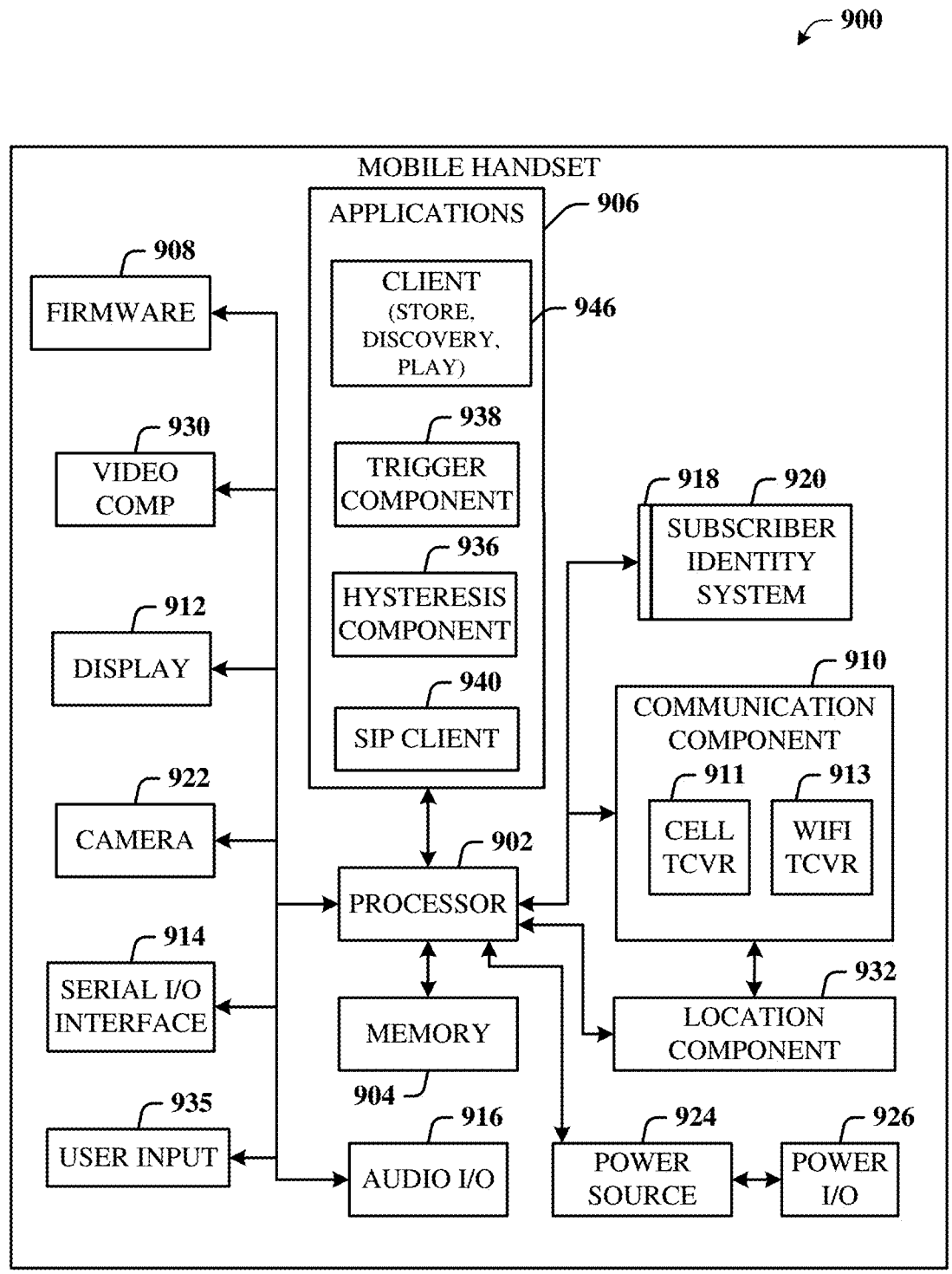
FIG. 9 illustrates an example block diagram of an example user equipment that can be a mobile handset in accordance with various aspects and embodiments of the subject disclosure.

Referring now to FIG. 9, illustrated is a schematic block diagram of an example end-user device such as a user equipment (e.g., UE 102) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description comprises a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 900 comprises a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 comprises a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also comprises a power source 924 in the form of batteries and/or an AC power subsystem, which power source 924 can interface to an external power system or charging equipment (not shown) by a power 110 component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, comprises an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
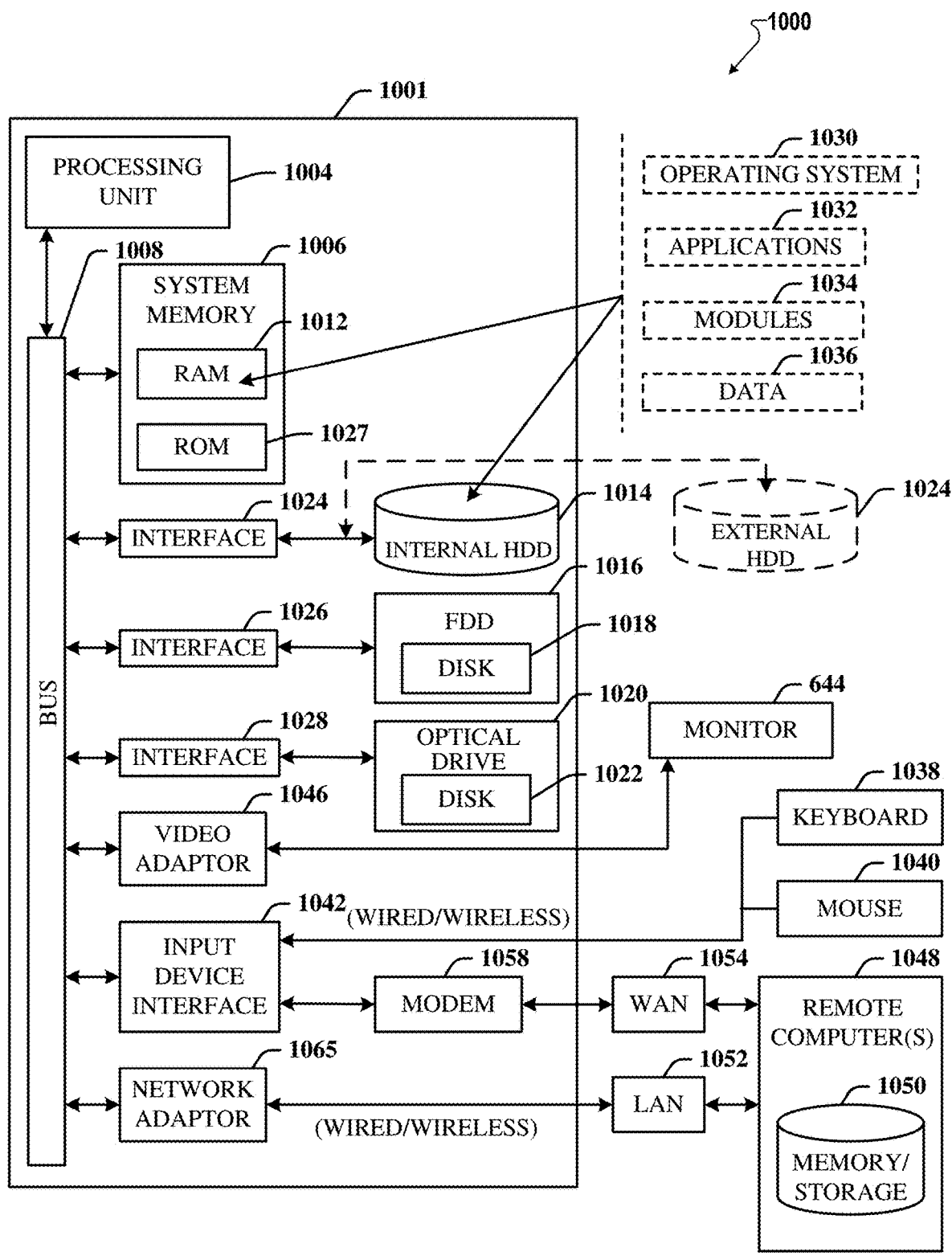
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 104) can contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 comprising a processing unit 1004, a system memory 1006 and a system bus 1008. The system bus 1008 couples system components comprising the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further comprises an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically comprises other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically comprises many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A network node device, comprising:
   a processor; and
   a memory that stores executable instructions that, when executed by the processor, facilitate performance of operations, comprising:
   receiving a signal from a user equipment indicating that the user equipment has decomposed a multiple input multiple output channel into multiple domains comprising an H domain and a V domain related to a co-variance between correlated antenna elements, and a U domain related to a co-phasing between multiple antenna sub-groups;
   based on the signal, configuring channel state information reference signal resources for the user equipment to use for measurement of the multiple domains;
   transmitting a message to the user equipment indicating the channel state information reference signal resources for the user equipment to facilitate the measurement of the multiple domains, wherein the message comprises a group of feedback formats;
   transmitting a channel state information reference signal using the channel state information reference signal resources configured for the multiple domains; and
   based on a decoding of feedback received from the user equipment, wherein the feedback comprises a feedback format selected from the group of feedback formats, determining a transmission parameter comprising a transmission protocol for transmissions between the network node device and the user equipment.

2. The network node device of claim 1, wherein the operations further comprise transmitting, to the user equipment, the transmission parameter.

3. The network node device of claim 1, wherein the user equipment comprises a wireless device.

4. The network node device of claim 1, further comprising an antenna panel with horizontal antenna elements and vertical antenna elements.

5. The network node device of claim 1, wherein the feedback format comprises an indicator of channel state information for the multiple domains, and wherein the indicator is employable to select the transmission parameter.

6. The network node device of claim 5, wherein the indicator of channel state information indicates a code-book entry related to a multiple input multiple output matrix for the transmissions.

7. The network node device of claim 1, wherein the feedback format comprises a channel quality indicator applicable to a quality of the channel between the network node device and the user equipment.

8. The network node device of claim 1, wherein the feedback format comprises a rank indicator representative of a number of different transmissions between the network node device and the user equipment.

9. A non-transitory machine-readable medium comprising executable instructions that, when executed by a user equipment comprising a processor, facilitate performance of operations, comprising:
   decomposing a multiple input multiple output channel into multiple domains comprising H and V domains related to a co-variance between correlated antenna elements, and a U domain related to co-phasing between multiple antenna sub-groups;
   transmitting a message to a network node device indicating that the user equipment has decomposed the multiple input multiple output channel into the multiple domains;
   measuring a channel state information reference signal for the multiple domains based on channel state information reference signal resource configurations received from the network node device;
   selecting a feedback format from a group of feedback formats received from the network node device, wherein:
   the feedback format to the network node device comprises an indicator of channel state information for the multiple domains, and
   the indicator is used for selection of a transmission parameter defining a transmission protocol related to the feedback format, the transmission protocol relating to transmissions between the user equipment and the network node device.

10. The non-transitory machine-readable medium of claim 9, wherein the operations further comprise transmitting, to the network node device, feedback conforming to the feedback format.

11. The non-transitory machine-readable medium of claim 9, wherein the operations further comprise receiving, from the network node device, the transmission parameter.

12. The non-transitory machine-readable medium of claim 9, wherein the indicator indicates a code-book entry related to a multiple input multiple output matrix for transmission of signals between the user equipment and the network node device.

13. The non-transitory machine-readable medium of claim 9, wherein the feedback format comprises a channel quality indicator applicable to a quality of a channel between the network node device and the user equipment.

14. The non-transitory machine-readable medium of claim 9, wherein the feedback format comprises a rank indicator that is a numeral related to a number of different transmissions between the network node device and the user equipment.

15. A method by a network node device, comprising:
- facilitating, by the network node device comprising a processor, receiving a signal received from a user equipment indicating that the user equipment has decomposed a multiple input multiple output channel into multiple domains, the multiple domains comprising H and V domains related to a co-variance between correlated antenna elements and a U domain related to a co-phasing between multiple antenna sub-groups;
- based on the signal, configuring, by the network node device, channel state information reference signal resources for the user equipment to measure the multiple domains;
- facilitating, by the network node device, transmitting a message to the user equipment indicating the channel state information reference signal resources for the user equipment to measure on the multiple domains, wherein the message comprises format information representative of a group of feedback formats;
- facilitating, by the network node device, transmitting a channel state information reference signal on the channel state information reference signal resources configured for the multiple domains;
- facilitating, by the network node device, receiving feedback from the user equipment, wherein the feedback comprises a feedback format selected from the group of feedback formats, and the feedback format comprises an indicator of channel state information for the multiple domains;
- decoding, by the network node device, the feedback resulting in decoded feedback;
- based on the decoded feedback, selecting, by the network node device, a transmission parameter comprising a transmission protocol for a transmission of signals between the user equipment and the network node device, wherein the selection of the transmission parameter is based on the indicator; and
- facilitating, by the network node device, transmitting the transmission parameter to the user equipment.

16. The method of claim 15, wherein the indicator indicates a code-book entry related to a multiple input multiple output matrix for transmission of signals between the user equipment and the network node device.

17. The method of claim 15, wherein the feedback format comprises a channel quality indicator applicable to a quality of the channel between the network node device and the user equipment.

18. The method of claim 15, wherein the feedback format comprises a rank indicator that is a numeral representative of different transmissions between the network node device and the user equipment.

19. The method of claim 15, wherein the transmission parameter comprises a modulation and coding scheme applicable to the transmission.

20. The method of claim 15, wherein the network node device comprises an antenna panel with a horizontal antenna element and a vertical antenna element.

* * * * *